United States Patent
Van Nieuwstadt

(10) Patent No.: US 7,971,426 B2
(45) Date of Patent: Jul. 5, 2011

(54) REDUCTANT INJECTION SYSTEM DIAGNOSTICS

(75) Inventor: Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 869 days.

(21) Appl. No.: 11/933,829

(22) Filed: Nov. 1, 2007

(65) Prior Publication Data

US 2009/0113877 A1 May 7, 2009

(51) Int. Cl.
*F01N 3/00* (2006.01)

(52) U.S. Cl. ............ 60/277; 60/274; 60/276; 60/286; 60/301; 60/303

(58) Field of Classification Search ........... 60/274, 60/277, 286, 295, 301
See application file for complete search history.

(56) References Cited

U.S. PATENT DOCUMENTS

| | | |
|---|---|---|
| 5,166,879 A | 11/1992 | Greene et al. |
| 6,167,698 B1 | 1/2001 | King et al. |
| 7,017,335 B2 | 3/2006 | Huber et al. |
| 2004/0045284 A1 | 3/2004 | Ripper et al. |
| 2005/0103000 A1 | 5/2005 | Van Nieuwstadt |
| 2006/0086084 A1 | 4/2006 | Gerlach |
| 2006/0168940 A1 | 8/2006 | Offenhuber et al. |
| 2006/0168941 A1 | 8/2006 | Pfaeffle et al. |

FOREIGN PATENT DOCUMENTS

GB 2400444 10/2004

OTHER PUBLICATIONS

ISA, United Kingdom Intellectual Property Office, International Search Report of GB0819830.1, Jan. 5, 2009, 1 page.

*Primary Examiner* — Thomas E Denion
*Assistant Examiner* — Diem Tran
(74) *Attorney, Agent, or Firm* — Julia Voutyras; Alleman Hall McCoy Russell & Tuttle LLP

(57) ABSTRACT

A method is described for controlling operation of a reductant injection system. In one example, a pump of the reductant injection system is operated at a pressure to inject reductant into an exhaust system based on voltage supplied to the pump. The method can allow operation of the reductant injection system during degradation of a pressure sensor that is used to determine reductant flow.

18 Claims, 5 Drawing Sheets

REDUCTANT INJECTION SYSTEM DIAGNOSTICS

TECHNICAL FIELD

The present application relates to the field of automotive emission control and diagnostic systems and methods.

BACKGROUND AND SUMMARY

Selective catalytic reduction (SCR) systems have been used to reduce automotive emissions. Such systems typically add a gaseous or liquid reductant, such as ammonia or urea, to the exhaust gas stream from an engine to be absorbed onto a catalyst where the reductant reacts with nitrogen oxides in the exhaust gas to form water vapor and nitrogen. Various systems have been developed to add the reductant to the exhaust upstream of the SCR. Many systems use multiple pressure sensors located in the emissions control system to meter the amount of reductant added to the exhaust stream.

One approach to measure the amount of reductant added to the exhaust stream is described in U.S. Pat. No. 6,167,698. Reductant is supplied to the exhaust stream through an exhaust gas purification system. The method determines the amount of reductant added to the exhaust stream based on the pressure differential between the exhaust stream and the reductant supply system.

The inventors herein have recognized that, for a variety of reasons, such as the caustic environment in the exhaust gas, purification system, one or more of the pressure sensors in the exhaust gas purification system may degrade.

One approach to address at least some of the above issues includes a method for controlling operation of a reductant injection system having a pump, injector, and pressure sensor located upstream of the injector in the reductant injection system. The method may comprise, under engine starting conditions: disabling the pump and opening the injector; and indicating degradation of the sensor when the sensor output, during the disabled pump operation and opened injector, disagrees with exhaust pressure. Specifically, under such conditions, the pressure sensor should agree with exhaust pressure, and disagreement may indicate that the sensor reading is erroneous.

Alternatively, or in addition, the method may include, adjusting actuation of the pump and/or injector during engine operation and reductant injection to compensate for any disagreement between the sensor and exhaust pressure, thereby providing improved reductant injection control. For example, sensor drift can be identified and corrected. However, if the sensor error is greater than a threshold, the system may transition to adjusting the pump and/or reductant injector actuation independent of the pressure sensor.

DETAILED DESCRIPTION OF THE DEPICTED EMBODIMENTS

Figure 1:
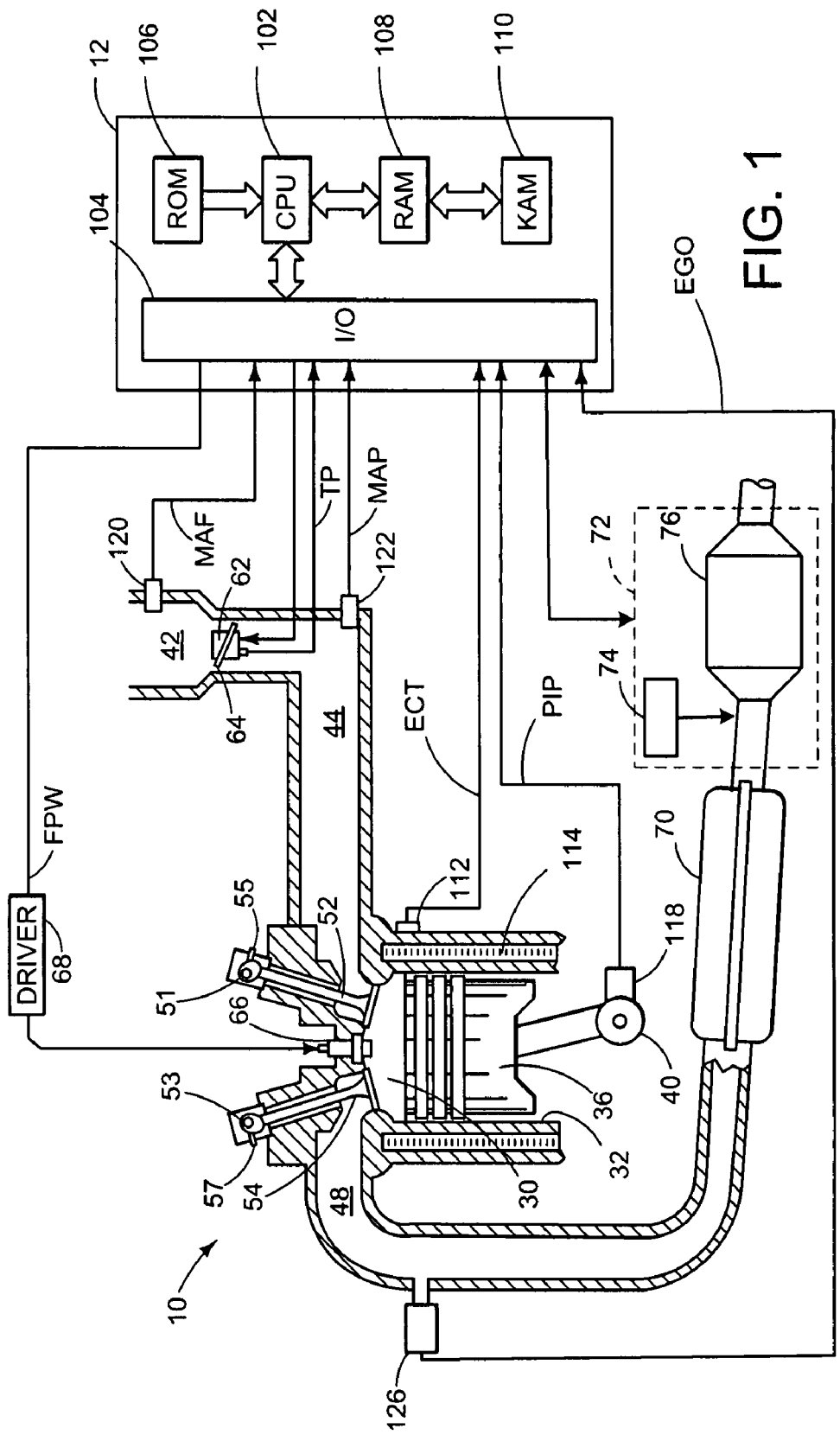
FIG. 1 shows an exemplary embodiment of an internal combustion engine and control system.

Referring now to FIG. 1, direct injection internal combustion engine 10, comprising a plurality of combustion chambers and controlled by electronic engine controller 12, is shown. The engine may be a diesel engine in one example, operating with diffusion combustion. However, in an alternative example, a spark ignited engine (not shown) may be used. Combustion chamber 30 of engine 10 includes combustion chamber walls 32 with piston 36 positioned therein and connected to crankshaft 40. In one example, piston 36 includes a recess or bowl (not shown) to form selected levels of stratification or homogenization of charges of air and fuel. Alternatively, a flat piston may also be used.

Combustion chamber 30 is shown communicating with intake manifold 44 and exhaust manifold 48 via intake valve 52, and exhaust valve 54. Fuel injector 66 is shown directly coupled to combustion chamber 30 for delivering liquid fuel directly therein in proportion to the pulse width of signal fpw received from controller 12 via conventional electronic driver 68. Fuel is delivered to fuel system (not shown) including a fuel tank, fuel pumps, and a fuel rail. In some embodiments, engine 10 may include a plurality of combustion chambers each having a plurality of intake and/or exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, combustion chamber 30 may alternatively include an intake valve controlled via electric valve actuation and an exhaust valve controlled via cam actuation including CPS and/or VCT.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Controller 12 activates fuel injector 66 so that a desired fuel injection amount is provided. Further, controller 12 is configured to activate fuel injector 66 so that multiple fuel injections may be performed during a cycle. In one example, a common rail injection system may be used.

Exhaust manifold gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, hydrocarbon (HC), or carbon monoxide (CO) sensor.

Catalytic converter 70 is shown in communication with exhaust manifold 48. In some embodiments, catalytic converter 70 may be a diesel oxidation catalyst.

Catalytic converter 70 is shown in communication with exhaust manifold 48. In some embodiments, catalytic converter 70 may be a diesel oxidation catalyst, a NOx trap, a diesel particulate filter (DPF), or combinations thereof. An emission control system 72 is shown downstream catalytic converter 70. Emission control system 72 may include reductant storage device 74 and emission control device 76, which may include an SCR catalyst. Emission control device 76 is shown in communication with catalytic converter 70. Reductant storage device 74 may supply a reductant to an exhaust stream entering emission control device 76. Emission control system 72 is described in more detail in FIG. 2.

Controller 12 is shown in FIG. 1 as a conventional microcomputer including: microprocessor unit 102, input/output ports 104, an electronic storage medium of executing programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load. Controller 12 is configured to control emission control system 72. Further, emission control system 72 may send feedback to controller 12.

Combustion in engine 10 can be of various types, depending on operating conditions. While FIG. 1 depicts a compression ignition engine, it will be appreciated that the embodiments described below may be used in any suitable engine, including but not limited to, diesel and gasoline compression ignition engines, spark ignition engines, direct or port injection engines, etc. Further, various fuels and/or fuel mixtures such as gasoline, diesel, H2, ethanol, methane, and/or combinations thereof may be used.

Figure 2:
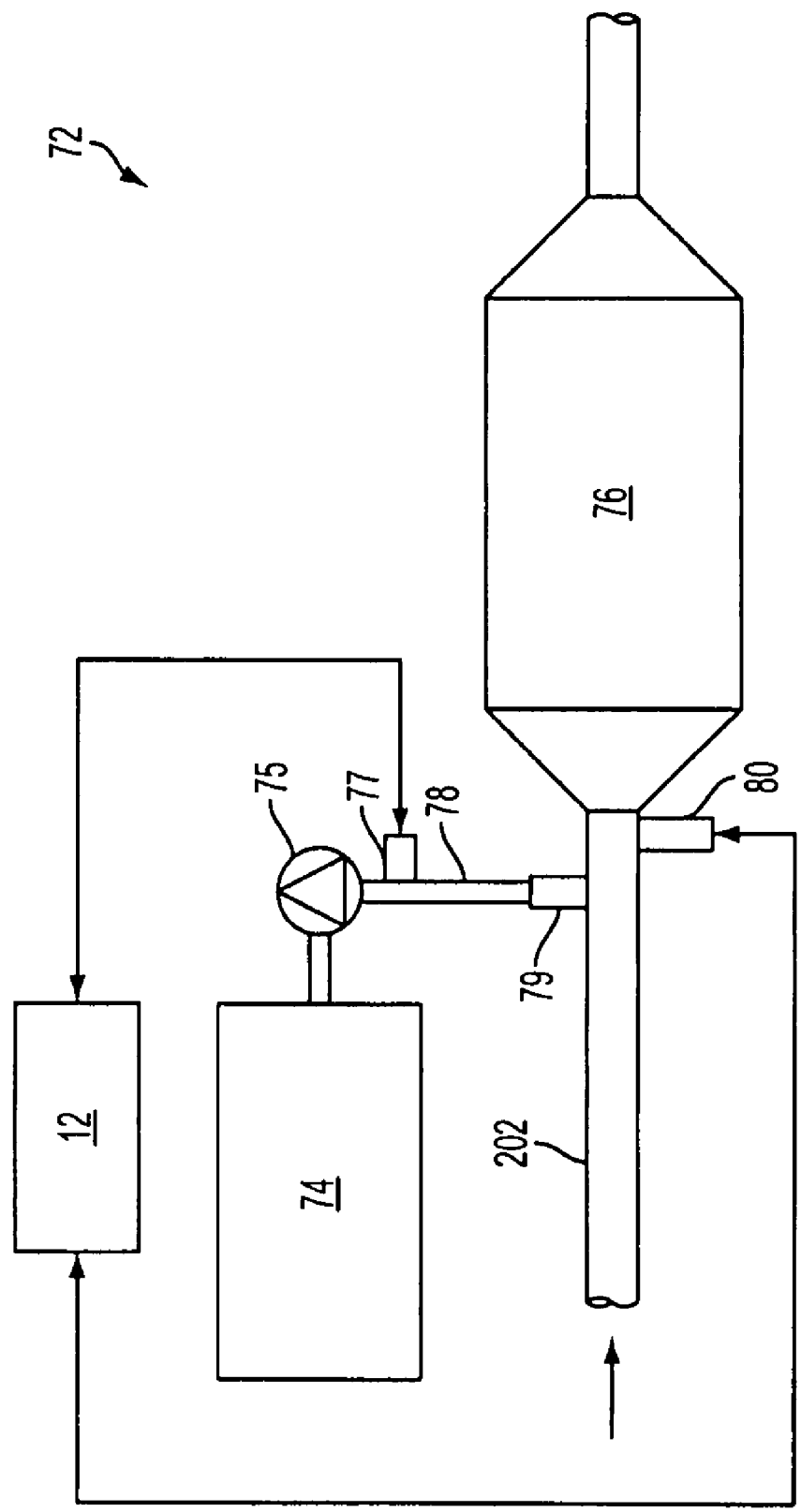
FIG. 2 shows an exemplary embodiment of an emission control system.

FIG. 2 shows an example of emissions control system 72 of engine 10 in more detail. Generally, the components described herein may operate to supply a reductant to exhaust system 202. In particular, emission control system 72 may supply a reductant to exhaust system 202 from a reductant storage device 74. Further, emission control system 72 may include controller 12 configured to control the selective supply of the stored reductant to the exhaust system. Pump 75 is fluidly coupled to the reductant storage device and the reductant injector 79. Pump 75 moves the reductant from a lower pressure, in the reductant storage device, to a higher pressure, in reductant line 78. In this embodiment pump 75 is an electronically controlled lift pump, which may be located in the storage device. In alternate embodiments, the pump may be mechanically controlled.

The reductant injector is used to adjust the amount of reductant that is supplied to exhaust system 202 by the emissions control system. Pressure sensor 77 measures the amount of pressure in line 78. Sensor 77 is coupled to controller 12. Pressure sensor 80 measures the pressure the exhaust in exhaust system 202 and is electronically coupled to controller 12. In some embodiments, pressure sensor 80 may be removed and the pressure in the exhaust stream may be estimated based on various operating conditions, ambient pressure, etc. Ambient pressure may be determined from a manifold pressure sensor before rotation of the engine, and/or estimated based on operating conditions of the engine.

Reductant storage device 74 may be an on-board storage device for storing a reductant (e.g., urea or hydrocarbons) used in emission control device 76. In particular, the reductant storage device may store an aqueous urea solution supplied by a vehicle operator, for example, although various other reductants may be used such as hydrocarbons.

Under some engine operating conditions, reductant from storage device 74 may be supplied to exhaust system 202. Accordingly, when such conditions are detected, the controller may prompt emission control system 72 to release an amount of reductant from the reductant storage device so as to substantially reduce NOx exiting emission control device 76 as described in FIG. 3, for example. As such, reductant from the reductant storage device may be absorbed in emission control device 76 to reduce NOx in the exhaust stream. In alternate embodiments another type of reductant may be used to increase the temperature in the exhaust stream, assisting DPF regeneration, in the example where a DPF may be placed downstream of device 76.

Further, under some conditions, the composition of urea and water in a plurality of phases may vary. For example, an amount of urea may solidify while a corresponding amount of water may not solidify. As such, the composition of the liquid urea solution may be altered to facilitate NOx reduction. Accordingly, it may be desirable to include a concentration sensor. Alternately or in addition, reductant storage device 74 may include a temperature sensor such that feedback from the temperature sensor may be used to determine a concentration of urea in the urea solution.

Figure 3:
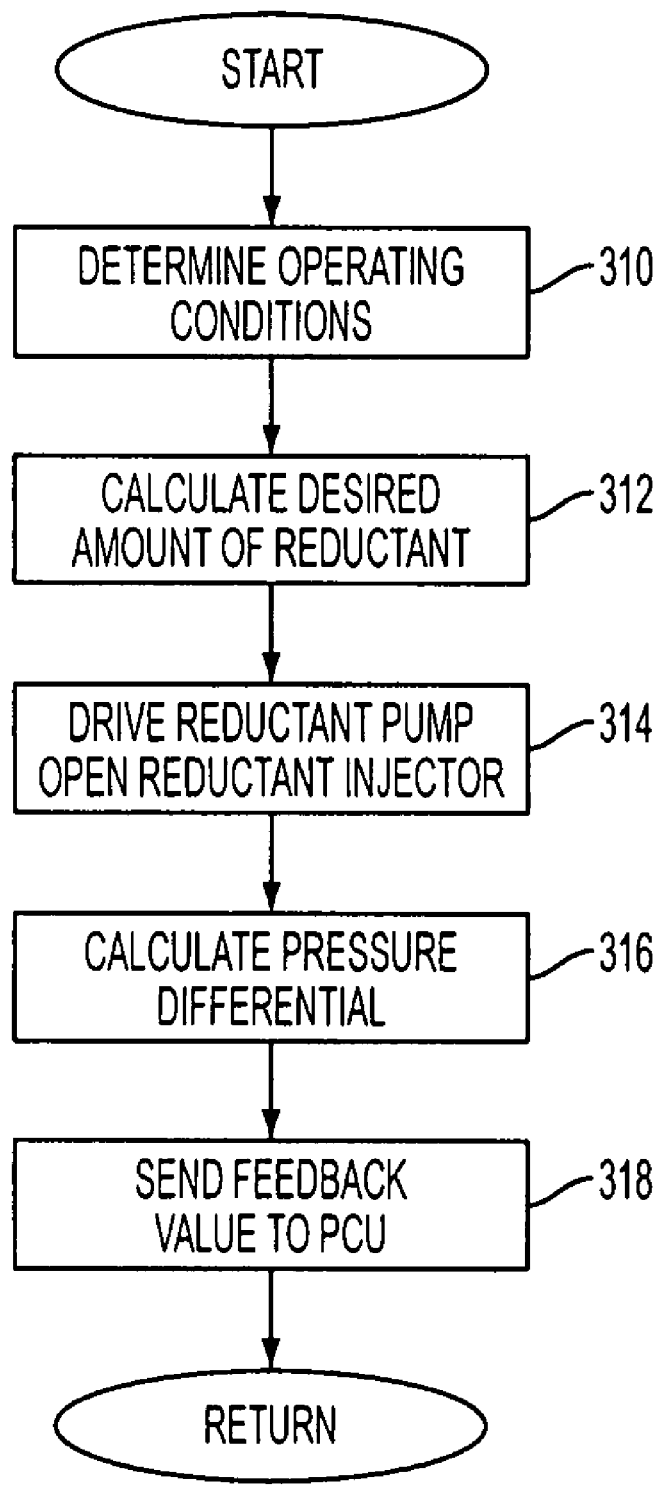
FIGS. 3, 4A, and 4B show example flowcharts of exemplary methods for controlling reductant injection and detecting degradation of a pressure sensor during engine start-up conditions.

Referring now to FIG. 3, it shows a method used to control the emission control system during normal operation of the engine where reductant is added to reduce NOx in device 76. The method may employ a closed loop control system as indicated, although open loop control of reductant injection pressure may also be used. The open loop control system may actuate the injector and/or adjust the pump to inject a desired amount of reductant based on predetermined relationships between pump voltage and pump pressure, and also based on predetermined relationships between injection pressure, injector pulsewidth, and injection amount. The open loop control of the pump and/or injectors may be independent of feedback from pressure sensors 77 and/or 80, for example.

Continuing with FIG. 3, at 310 the operating conditions are determined. These operating conditions may include exhaust pressure, reagent pressure, crank angle, engine temperature, exhaust gas temperature, exhaust gas composition, and throttle position.

The routine then proceeds to 312 where the desired amount of reductant that is needed to decrease emissions is calculated. This calculation may be carried out in controller 12 based on operating conditions, including catalyst temperature, reductant injection pressure, engine speed, engine load, exhaust air-fuel ratio, NOx emissions, etc.

The routine then advances to 314 where the reductant pump may be adjusted and the reductant injector is actuated. The actuation of the injector and adjustment of the pump may be based on feedback from the pressure sensor 77. The sensor, along with exhaust pressure (which may be measured or estimated based on engine operating conditions such as engine flow, manifold pressure before engine operation, etc.) may be used to indicate the pressure differential between the reagent pressure and the exhaust pressure. This feedback may be used to adjust the pump and/or injector actuation so that the desired amount of reagent added to the exhaust stream is provided. In this way, closed loop control of the reductant pump and injector may be used.

Figure 4A:
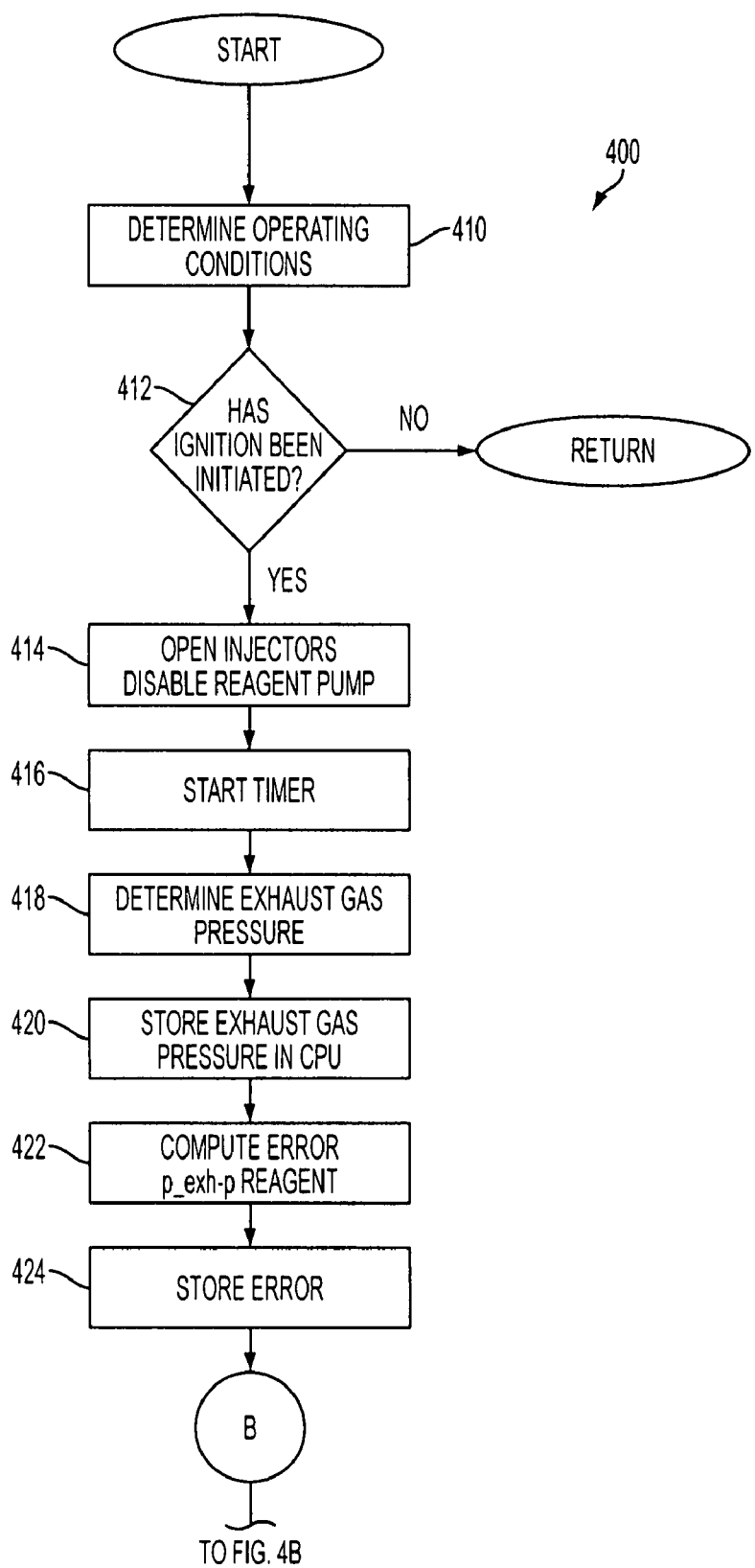
Figure 4B:
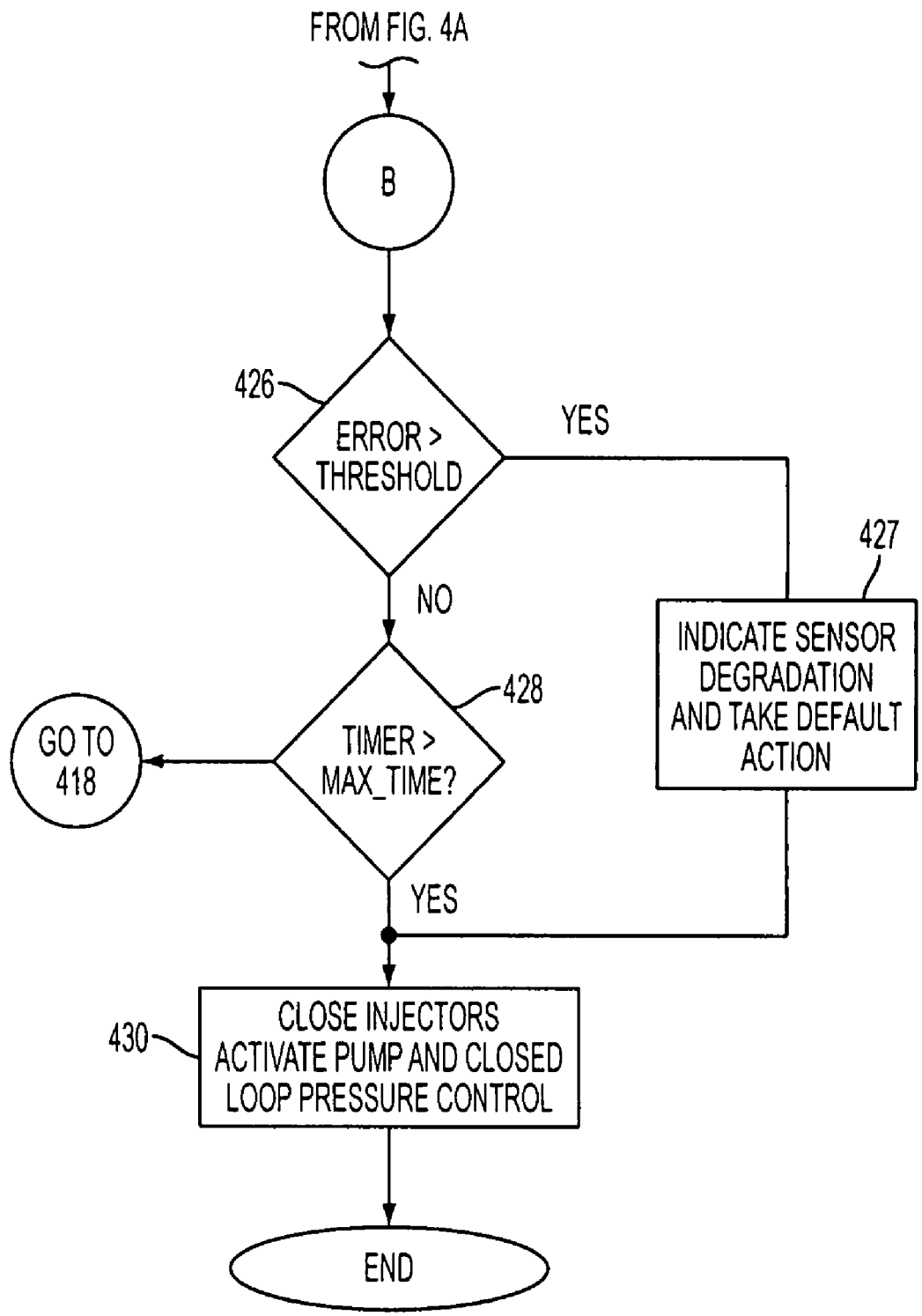

FIG. 4 shows a flow chart of an exemplary method for determining whether the reagent pressure sensor 77 has degraded. When it is established that degradation of the pressure sensor has occurred corrective actions may be used to facilitate accurate control of the amount of reductant added to the exhaust system. For example, the pump and/or reductant injector may be operated in an open-loop mode, where the pump voltage is assumed to generate a specified pressure. As another example, the system may learn errors in the sensor, and correct the sensor reading, so that accurate closed loop control may be carried out using the corrected sensor reading.

In some embodiments the diagnostic method, as described in FIG. 4, may be carried out during key on but prior to engine start up. In alternate embodiments the process may be carried out before engine run up or before engine warmed-up operation.

At 410 various operating conditions are determined. Various operating conditions are acquired by various sensors in the engine such as valve position sensor 55, pressure sensor 77, key position sensor (not shown), throttle position sensor 120, and pressure sensor 80. These various sensors are electronically coupled to controller 12 that processes the data that is acquired by the sensors. The operating conditions may also include exhaust pressure, exhaust temperature, reagent pressure, reagent temperature, engine temperature, throttle position, engine speed, air/fuel ratio, key position, manifold air pressure, and crank angle. In one embodiment, the system may determine ambient pressure at key-on before engine operation by reading the initial output of the manifold pressure sensor. In this way, a more accurate estimate of exhaust pressure may be obtained, especially exhaust pressure before engine operation, as it is substantially equal to ambient (and intake manifold) pressure. Alternatively, exhaust pressure may be identified from sensor 80, if present.

If it is determined that ignition has not been initiated at 412, the routine returns to the start. However, if the ignition is initiated, the routine then proceeds to 414 where injector 79 is opened and the reagent pump 75 is disabled. The operation of the injectors may be initiated by controller 12, which is electronically coupled to reagent pump 75 and injector 79.

The routine then advances to 416 where a timer is started. In this embodiment, the timer may be a simple program initiated in the controller that measures time. In alternate embodiments, the timer may include a separate circuit in which time is measured. The timer is initiated to measure the length of time that the injectors are open to facilitate an accurate measurement of reagent pressure that is substantially the same as exhaust pressure.

The routine then advances to 418 where the exhaust gas pressure is determined. The exhaust gas pressure may be determined in a number of different ways by the controller. The exhaust gas pressure may be determined by pressure sensor 80, which is electronically coupled to the controller. In an alternate embodiment the pressure sensor 80 may be removed and the exhaust gas pressure may be modeled by the controller. The controller's model may correlate variables such as exhaust temperature, DPF temperature, crank angle, intake pressure, or throttle position with exhaust gas pressure. The routine then proceeds to 420 where the exhaust gas pressure is stored in any of the various memory storage devices inside the controller such as RAM or ROM.

The routine then advances to 422, where the difference between the exhaust gas pressure and the reagent pressure are calculated, which may be indicative of an error in the pressure sensor 75.

The routine proceeds to 424 where the computed error is stored. The error may be stored in any of the various memory storage devices located in the controller, such as the RAM or the ROM.

The routine then advances to 426 where it is determined whether or not the error exceeds a first threshold value. The first threshold value may be preset in the controller. Alternatively the first threshold value may be determined by a look up table that correlates specific threshold values with the time that has elapsed. If the absolute value of the error is greater than the first threshold value for some time, the routine advances 427.

At 427 the routine indicates that sensor degradation of sensor 77 has occurred and takes default action. The default action may include adjusting an offset of sensor 77, by the previously calculated error, and continuing feedback control of the reagent pump as shown at 430. Adjusting an offset of sensor 77 modifies the amount of reductant that the closed loop control system adds during normal operation of the engine. Alternatively, if the sensor is completely inoperable, which may be indicated by an error that is greater than a second threshold value, the default action may include operating the reagent pump in an open-loop mode. The default action may further include setting a diagnostic code in controller 12 indicating that sensor 77 has degraded. The routine then advances to 430.

At 430 the injectors are closed, pump 75 is activated, and the closed loop pressure control is activated, utilizing a modified signal from sensor 77 to account for the sensor error. The closed loop pressure control is used to control the emission system when the engine is operating and reductant is injected to react with NOx generated during combustion.

Continuing with FIG. 4, if the absolute value of the error is less than the threshold value the routine proceeds to 428 where it is determined whether or not the timer has exceeded a maximum timer value. The maximum timer value may be predetermined. Alternatively the maximum timer value may be determined by the controller every iteration.

If the timer has exceeded the maximum timer value the routine proceeds to 430 where the injectors are closed, the pump is activated, and the closed loop pressure control is activated. After step 430 the routine returns to the start.

However, if the timer has not exceeded the maximum timer value, the routine moves to 418 where the exhaust gas pressure is again determined.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling reductant injection, comprising:
   disabling a pump;
   opening an injector located downstream of the pump and a sensor;
   indicating sensor degradation when the sensor's output disagrees with exhaust pressure while the pump is disabled and the injector is open; and
   adjusting the pump based on predetermined relationships between pump voltage and pump pressure in response to indicated sensor degradation.

2. The method of claim 1 where said pump is disabled and the injector opened during key-on and before engine rotation.

3. The method of claim 1 where said pump is adjusted based on predetermined relationships between pump voltage and pump pressure in response to indicated sensor degradation when the sensor is inoperable, and where an offset of the sensor is adjusted when the sensor output disagrees with exhaust pressure by greater than a threshold value.

4. The method of claim 1 where said pump is disabled and the injector opened before engine run-up.

5. The method of claim 1 where said pump is disabled and the injector opened before warmed-up engine operation.

6. The method of claim 1 wherein the pump is disabled and the injector opened for a predetermined time, and then the injector is closed so that the pump may be activated to pressurize stored urea for engine operation.

7. The method of claim 1 further comprising storing urea in a storage element of a reductant injection system, where exhaust pressure is estimated based on a manifold pressure sensor before engine rotation.

8. The method of claim 1 further comprising storing urea in a storage element of a reductant injection system, where exhaust pressure is measured from a sensor in an exhaust system of an engine.

9. A method for controlling operation of a reductant injection system having a pump, an injector, and a pressure sensor located upstream of the injector in the reductant injection system, the method comprising:
   under engine starting conditions:
      disabling the pump;
      opening the injector; and
      storing a difference between the pressure sensor and exhaust pressure during disabled pump operation and while the injector is open; and
   during engine operation, adjusting at least one of the pump and injector actuation to provide urea to engine exhaust upstream of an SCR catalyst when the pressure sensor is operable, where the adjusting is responsive to the difference, and operating the pump based on predetermined relationships between pump voltage and pump pressure to inject reductant into an exhaust system when the pressure sensor is inoperable.

10. The method of claim 9 where said pump is disabled and the injector opened during key-on and before engine rotation.

11. The method of claim 9 where a timer is started after opening the injector and where a pressure sensor output is compared to exhaust pressure for a predetermined amount of time except when indicating degradation of the pressure sensor.

12. The method of claim 9 where said pump is disabled and the injector opened before engine run-up, where injector actuation is adjusted based on the difference.

13. The method of claim 9 where said pump is disabled and the injector opened before warmed-up engine operation, where pump actuation is adjusted based on the difference.

14. The method of claim 9 wherein the pump is disabled and the injector opened for a predetermined time, and then the injector is closed so that the pump may be activated to pressurize stored urea for engine operation.

15. The method of claim 9 further comprising indicating sensor degradation based on the difference.

16. A system for an engine, the engine having an exhaust system, comprising:
   a urea delivery system having a storage unit, a pump, an injector, and a pressure sensor located upstream of the injector, the injector coupled to the exhaust system;
   an SCR catalyst coupled in the exhaust system downstream of the injector;
   a controller to, before engine operation, disable the pump and open the injector; and store a difference between the pressure sensor and exhaust pressure during disabled pump operation and while the injector is open; and close the injector, the controller further, during engine operation, adjusting at least one of the pump and injector actuation to provide urea to engine exhaust upstream of the SCR catalyst when the pressure sensor is operable, where the adjusting is responsive to the difference, the controller further indicating sensor degradation based on the difference, and where the controller operates the pump based on predetermined relationships between pump voltage and pump pressure to inject reductant into the exhaust system when the pressure sensor is inoperable.

17. The system of claim 16 where the controller, during engine operation, adjusts the at least one of the pump and injector actuation responsive to the pressure sensor.

18. The system of claim 17 where the controller sets a diagnostic code based on the difference.

* * * * *